United States Patent [19]

Muller

[11] Patent Number: 4,859,049
[45] Date of Patent: Aug. 22, 1989

[54] CONTACT LENS FOR ORIENTED OPTICAL CORRECTIONS

[75] Inventor: Gérard Muller, Route de Blonay 28, 1800 Vevey, Switzerland

[73] Assignee: Gerard Muller, Vevey, Switzerland

[21] Appl. No.: 90,468

[22] Filed: Aug. 28, 1987

Related U.S. Application Data

[63] Continuation of Ser. No. 268,135, May 29, 1981, abandoned.

[30] Foreign Application Priority Data

Jun. 12, 1980 [EP] European Pat. Off. ........ 80810194.3

[51] Int. Cl.$^4$ .......................... G02C 7/04; G02C 7/06
[52] U.S. Cl. ................................ 351/161; 351/160 R; 351/160 H
[58] Field of Search ............... 351/160 R, 160 H, 161, 351/162

[56] References Cited

U.S. PATENT DOCUMENTS 4,095,878  6/1978  Fanti ................................. 351/161
4,211,476  7/1980  Brummel et al. ............... 351/160 R
4,268,133  5/1981  Fischer et al. ...................... 351/161

FOREIGN PATENT DOCUMENTS 0008726  8/1979  European Pat. Off. .
431950   7/1926  Fed. Rep. of Germany ...... 351/161
2046389  3/1972  Fed. Rep. of Germany .

Primary Examiner—John K. Corbin
Assistant Examiner—Scott J. Sugarman
Attorney, Agent, or Firm—Marks Murase & White

[57] ABSTRACT

The contact lens comprises a central optical zone and a peripheral zone for fastening the lens. For centering said lens the peripheral zone comprises two stabilizing bosses which are disposed on the horizontal stabilization axis of the lens. For large palpebral openings it may be preferable to use two pairs of bosses, whereby each pair comprises two bosses, disposed symmetrically to said axis of stabilization. For multifocal corrections it is possible to use a third boss, disposed on the vertical axis of the lens. These stabilizers allow a perfect centering of the lens, hindering its rotation and the use of very thin lenses.

10 Claims, 4 Drawing Sheets

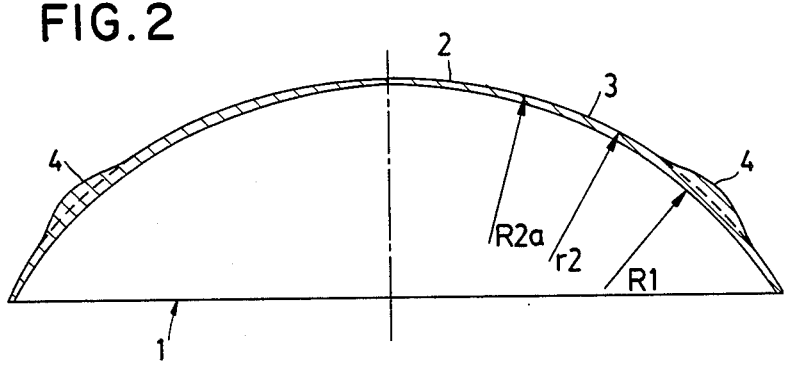
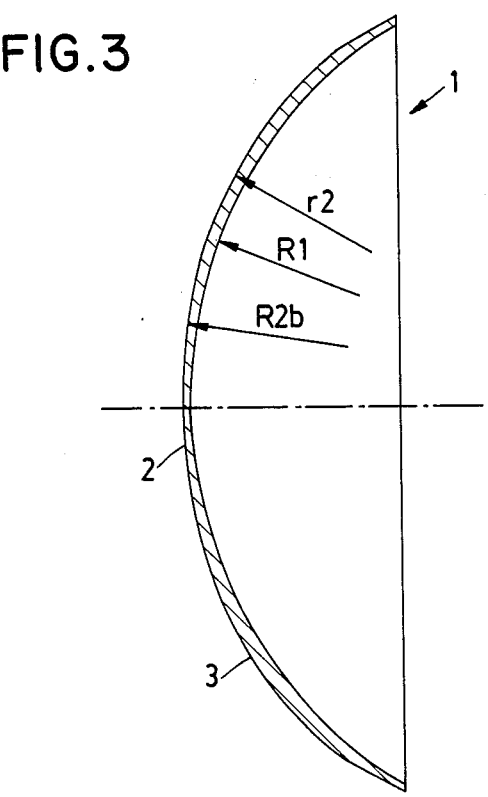

CONTACT LENS FOR ORIENTED OPTICAL CORRECTIONS

This application is a continuation of application Ser. No. 268,135, filed 5/29/81, now abandoned.

BACKGROUND OF THE INVENTION

Contact lenses comprise a central zone called optical zone and a peripheral zone for the fastening of the lens. The contact lenses are always in movement on the eye, these movements being linear or rotative.

The spherical optical corrections are not affected by movements, all other types of correction however, of the astigmatic, prismatic, bi- and multifocal type are oriented optical corrections for which any rotation must be avoided.

Known means for stabilizing these rotations are of two types, however similar in that they are based on the prismatic shape of the lense. In the first type the means is a monoprismatic shape with the greatest thickness at the lower border. The weight of this border, thus increased, makes rocking the lens into the desired position by successive oscillations. Sometimes the lower border is truncated for increasing stability. In the second type the means is a bi-prismatic shape with the greatest thickness horizontal at the center of the lens. The stabilization is obtained by the pressure of the eyelids on two inclined planes.

The German Publication No. 2 046 389 discloses a contact lens with one reinforcement at the lower part of the extreme border, which hinders the sinking down of the lens and enables the centering of the contact lens. This one reinforcement does not completely avoid rotation of the lens and the lens becomes relatively thick.

The published European Patent Application No. 0 008 726 discloses a contact lens having a toric and a prismatic part as mentioned above, the prismatic part increasing the thickness of the lens.

OBJECT AND BRIEF SUMMARY OF THE INVENTION

It is an object of the present invention to cope with the above mentioned inconveniences and to disclose means for a perfect stability of contact lenses of all types, whilst maintaining a minimum thickness of it.

This object as attained with a lens having in its peripheral zone at least two bosses placed on or symmetrically to the horizontal axis of stabilization of the lens.

BRIEF DESCRIPTION OF THE DRAWING

The invention will be further described by way of example with reference to the accompanying drawing, wherein FIG. 2 shows a horizontal section of the lens of FIG. 1, FIG. 3 shows a vertical section of the lens of FIG. 1.

DESCRIPTION OF THE PREFERRED EMBODIMENTS

Figure 1:
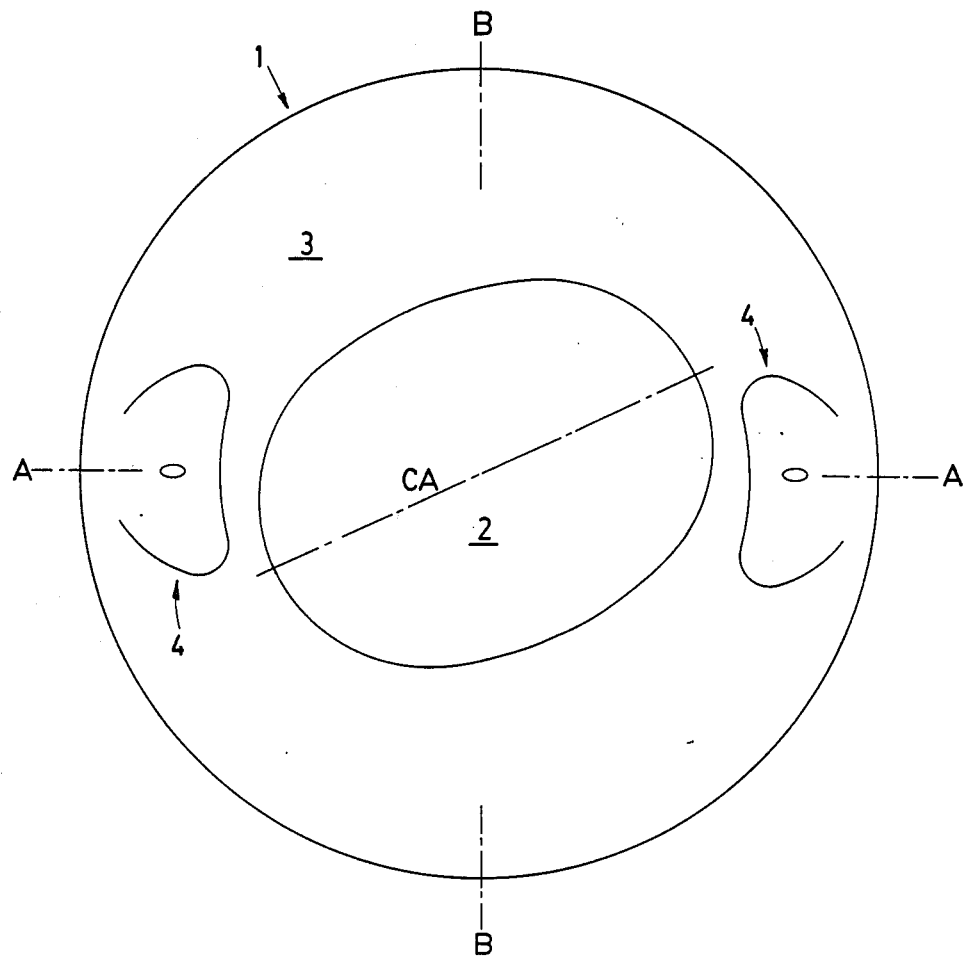
FIG. 1 shows a view on a lens according to the invention.

In FIG. 1 there is shown a contact lens 1 with its optical zone 2, its peripheral zone 3 and the axis of correction CA. Two bosses 4 are aligned in the horizontal axis of stabilization AA, on both sides of the optical zone and centered with reference to it, for ensuring an excellent stabilization of the lens. The bosses have a thickness of 0.1–0.4 mm and preferably 0.15–0.3 mm and can have a spheric or cushion-like shape or any other appropriate shape. It is however important that the bosses have rounded edges which can rest on the edge of the eyelid without provoking irritations. This particular embodiment refers to an astigmatic oriented correction, which axis of correction is independent of the axis of stabilization. The determination of the angle formed by the axis of correction and the axis of stabilization is performed by the lens-fitting practitioner.

In FIG. 2 there is shown the internal curvature with the radius R1, the external curvature of the peripheral zone with the radius r2 and the external curvature of the optical zone with the radius R2a. FIG. 3 shows further radius R2b of the external curvature of the optical zone.

The bosses can be produced by turning, milling, or polymerization during the processing of the lens. It is possible to use more than two bosses in the peripheral zone and especially in the interpalpebral space.

Figure 5:
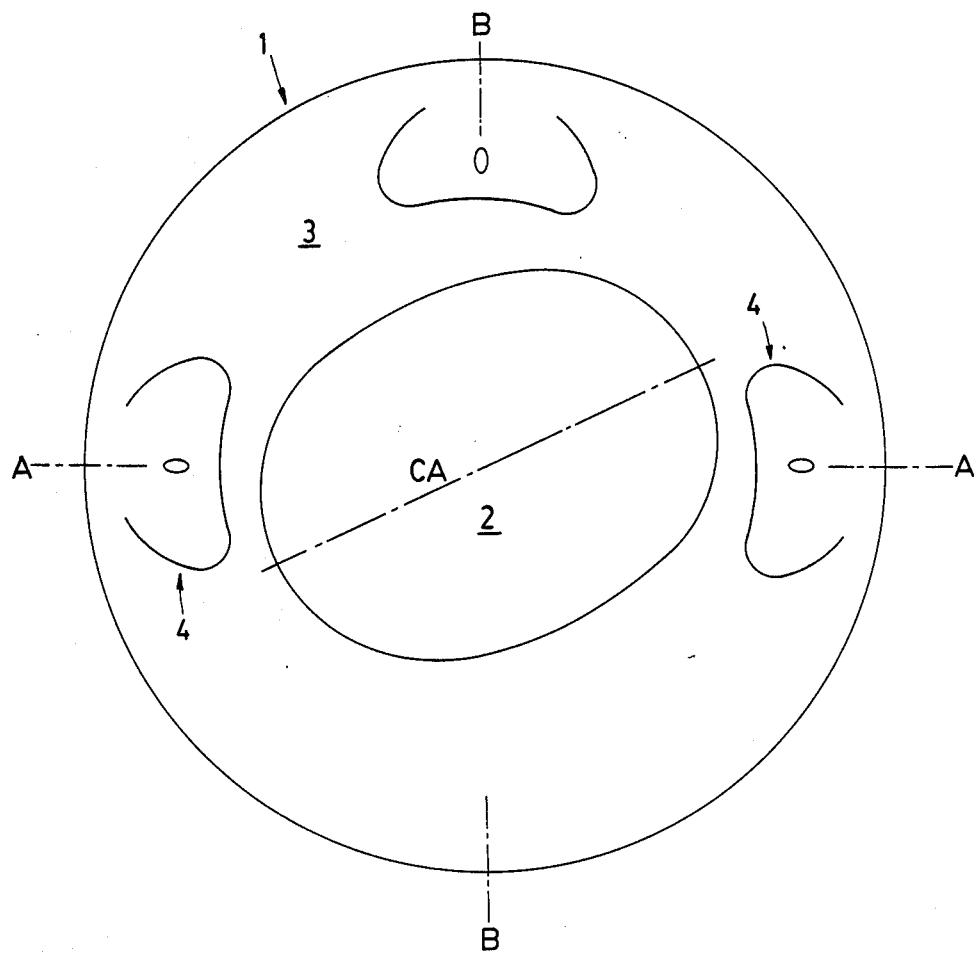
FIG. 5 shows a modification of the lens of FIG. 1 according to the invention.

Each flutter of the eyelid contributes to hold the lens perfectly oriented. The number and the place of the stabilization bosses are determined by the palpebral morphology and the type of correction. As common rule it can be said that two bosses, disposed according to FIG. 1, are necessary and enough in the majority of the cases. It is however not obligatory that the center of the boss is on the axis of stabilization. In the case of multifocal correction it may be necessary to introduce a third stabilizer on the vertical axis such as shown in FIG. 5.

Figure 4:
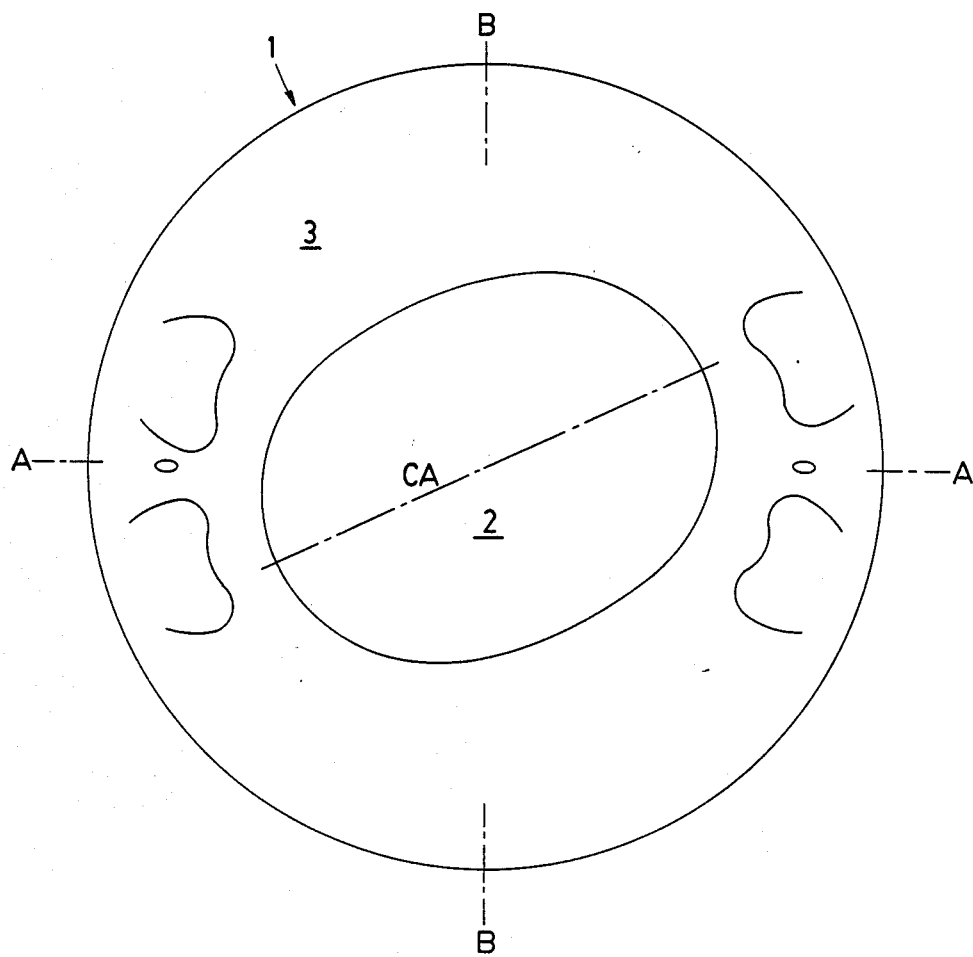
FIG. 4 shows a view of another embodiment of a lens according to the invention.

In the case of a very large palpebral opening it is possible to replace each horizontal stabilizer of FIG. 1 by two vertical stabilizers, disposed symmetrically to the axis of stabilization, such as shown in FIG. 4.

It is clear that these stabilizers in the form of bosses are not only applicable for this type of hydrophilic toric and very thin flexible lens, but also for other types of contact lenses and for all material which is suitable for producing lenses.

I claim:

1. A contact lens for oriented optical correction having a horizontal axis of stabilization, a central optical zone and a peripheral zone, wherein said lens comprises in its peripheral zone means adapted for cooperative engagement with at least one eyelid of a wearer for orientation of said lens about said horizontal axis of stabilization, said means including at least two stabilizing bosses protruding from said lens surface, said bosses being disposed on or symmetrically to said horizontal axis of stabilization.

2. The lens of claim 1, wherein the bosses are disposed so as to be centered with reference to said optical zone.

3. The lens of claim 1, comprising two pairs of bosses, the two bosses of one pair being disposed symmetrically to said horizontal axis of stabilization.

4. The lens of claim 1, comprising further at least one boss placed on or symmetrically to the vertical axis of said lens.

5. The lens of claim 1, wherein the height of said bosses comprises between 0.1 and 0.4 mm, preferably between 0.15 and 0.3 mm.

6. The lens of claim 1, wherein each of said bosses is dome-shaped.

7. A spherically asymmetric contact lens having a generally arcuate and circular primary surface with a pair of diametrically opposed protrusion means for orienting said primary surface;

wherein said protrusion means are integrally formed with said primary surface and comprise mounded surface elements adapted to rotate said primary surface in response to temporary contact with an eyelid.

8. The lens of claim 7, wherein each of said mounded surface elements is rounded.

9. The lens of claim 7, wherein each of said mounded surface elements is dome-shaped.

10. The lens of claim 7, wherein each of said mounded surface elements is a region in space bounded by a simple closed curve.

* * * * *